(No Model.)

T. C. HUDSON.
BRACELET.

No. 365,257. Patented June 21, 1887.

Witnesses.
W. R. Haight
R. W. Bishop.

Inventor:
Thos. C. Hudson
By W. H. Babcock
Atty.

UNITED STATES PATENT OFFICE.

THOMAS C. HUDSON, OF PROVIDENCE, RHODE ISLAND.

BRACELET.

SPECIFICATION forming part of Letters Patent No. 365,257, dated June 21, 1887.

Application filed August 3, 1885. Serial No. 173,331.. (No model.)

*To all whom it may concern:*

Figure 1:
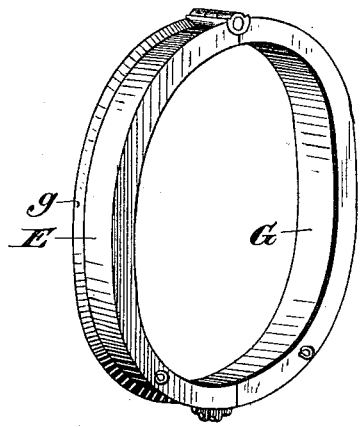
Figure 2:
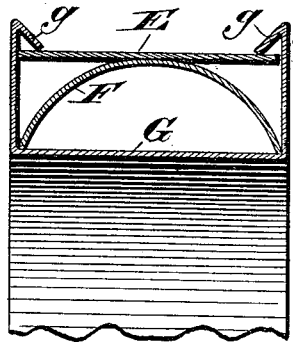

Be it known that I, THOMAS C. HUDSON, of Providence, in the State of Rhode Island, have made certain new and useful Improvements in Bracelets; and I do hereby declare that the following specification, taken in connection with the drawings making a part of the same, is a full, clear, and exact description thereof.
My invention relates to bracelets made of several plates rolled together; and it consists in the construction and combination of three of such plates, substantially as hereinafter set forth.
In the accompanying drawings, Figure 1 represents a perspective view of a bracelet embodying my invention. Fig. 2 represents a vertical section through the compound plate of which the body of said bracelet is formed.
This compound plate consists of a flat plate, E, a transversely-arched plate, F, which supports plate E, and a trough-shaped plate, G, having its sides bent up at right angles to its bottom and their edges turned down at an acute angle, forming flanges $g$, which are against the outer face of plate E. The edges of arched plate F are in the lower angles of plate G. These three plates are therefore held firmly in position and constitute a compound plate, which only needs to be bent into the form shown in Fig. 2 and held by any convenient clasp to constitute a bracelet.

Having thus described my invention, what I claim as new, and desire to secure by Letters Patent, is—

1. A compound plate for a bracelet, consisting of the flat plate E, the arched plate F, and the trough-shaped plate G, having the flanges $g$ turned down on plate E, substantially as set forth.

2. A bracelet formed from a compound plate consisting of flat plate E, arched plate F, and trough-shaped plate G, having flanges $g$ turned down on plate E, substantially as set forth.

THOMAS C. HUDSON.

Witnesses:
WALTER B. VINCENT,
E. F. WARNER.